(12) United States Patent
Roberts

(10) Patent No.: US 7,112,350 B1
(45) Date of Patent: Sep. 26, 2006

(54) METHOD FOR APPLYING LINER TO AIR DUCT

(75) Inventor: Gregory W. Roberts, Tulsa, OK (US)

(73) Assignee: Duct Seal Systems, Inc., Tulsa, OK (US)

( * ) Notice: Subject to any disclaimer, the term of this patent is extended or adjusted under 35 U.S.C. 154(b) by 299 days.

(21) Appl. No.: 10/621,171

(22) Filed: Jul. 14, 2003

(51) Int. Cl.
*B05D 1/02* (2006.01)
*B05D 7/22* (2006.01)

(52) U.S. Cl. .................. 427/476; 427/236; 427/427.2; 427/427.3

(58) Field of Classification Search ................ 427/476, 427/486, 236, 427.2, 427.3
See application file for complete search history.

(56) References Cited

U.S. PATENT DOCUMENTS

| 2,513,289 A | 7/1950 | Crom |
| 3,495,626 A | 2/1970 | Nagel |
| 3,960,644 A | 6/1976 | McFadden |
| 4,401,696 A | 8/1983 | Wood |
| 4,970,364 A | 11/1990 | Muller |
| 5,656,117 A | 8/1997 | Wood et al. |
| 6,479,097 B1 | 11/2002 | McIntyre, Jr. et al. |
| 6,699,324 B1* | 3/2004 | Berdin et al. ............... 118/306 |
| 2003/0044523 A1* | 3/2003 | Brass ......................... 427/157 |
| 2003/0161946 A1* | 8/2003 | Moore et al. ............... 427/236 |

FOREIGN PATENT DOCUMENTS

WO 00/44506 * 8/2000

* cited by examiner

*Primary Examiner*—Fred J. Parker
(74) *Attorney, Agent, or Firm*—Molly D. McKay

(57) ABSTRACT

A system for sealing an air duct by coating the interior of the duct with a material similar to the coating used for spray-on truck bed liners. A spray device applies the liner material to the interior surface of the ducts and the spray device is held in the center of the duct by retractable sets of wheels. The spray device is removably attached to a supply hose that provides liner material to the spray device from a storage tank via a supply pump. The supply hose is first fed through the duct, the spray head is attached to the supply hose and the liner material is sprayed onto the duct as the spray head is retracted through the duct. The system can be either computer or manually controlled and can optionally employ an electrostatic unit to put opposite electrical charges on the duct and the liner material.

7 Claims, 3 Drawing Sheets

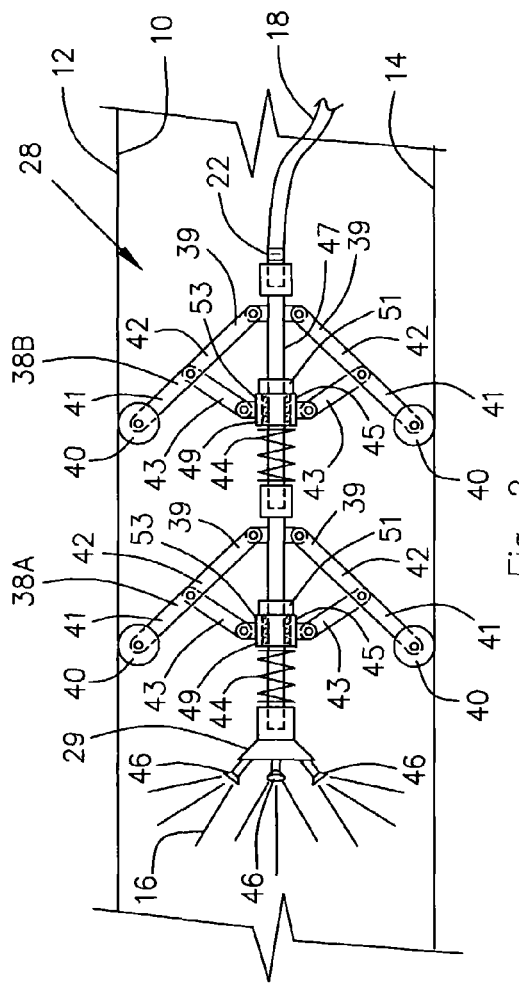
Fig. 2
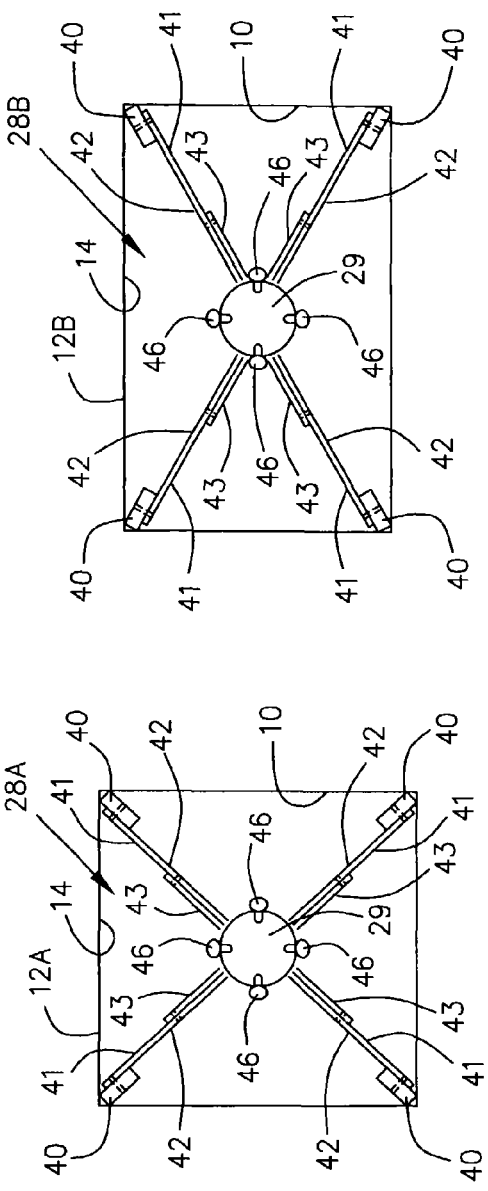
Fig. 5
Fig. 4
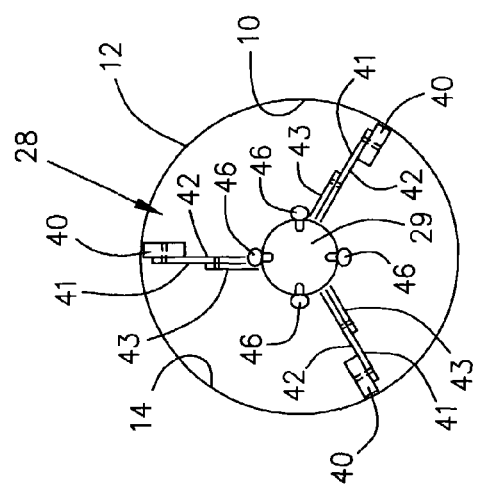
Fig. 3

METHOD FOR APPLYING LINER TO AIR DUCT

BACKGROUND OF THE INVENTION

1. Field of the Invention

The present invention relates to a system for sealing air handling ducts, particularly those air ducts that are located in a cement slab floor or under a slab floor.

2. Description of the Related Art

Slab floor buildings normally have the heating and air conditioning air ducts located in the cement slab floor of the building. If the building experiences structural problems, such as a cracked foundation, or has moisture and rust in the ducts, the most common remedy for these problems is to abandon the existing duct system and install a new duct system and new equipment in the ceiling of the building. Then the old abandoned duct system is normally closed off by pouring cement into the duct openings.

The problems associated with this solution are that installation of a new duct system is time consuming, expensive, and can be extremely difficult, particularly if the building is more than one story high.

Instead of replacing the duct system, a more cost effective and less disruptive solution would be to provide some type of liner for the existing duct system that would have structural integrity, i.e. be air and water tight, and would fill in any gaps or holes in the existing duct system caused by movement in the surrounding cement slab. Also, such a sleeve should be easy to install at normal atmospheric temperatures, be inert so that it provides a clean, flame-resistant, sanitary, and stable surface for carrying air throughout the building.

The present invention answers this need in that it is a relatively fast, easy, and inexpensive method of repairing an existing air duct by providing a lining on the interior surfaces of the existing air duct system. The liner is installed according to the present invention at normal atmospheric temperatures and quickly cures to a tough, smooth, and inert surface that is air and water tight. The present liner is effective in filling in gaps or holes that may be present in the duct system due to movement in the surrounding concrete slab and completely covering and sealing rust, mold, or mildew resulting from the presence of moisture in the ducts.

SUMMARY OF THE INVENTION

The present invention is a method or system for sealing an air duct system of a heating and air conditioning system as a way of remediating the air ducts after the ducts have been damaged due to moisture in the ducts or due to movement in the cement foundation in which the air ducts are located. More specifically, the present invention is a system for coating the interior of the ducts of an air duct system with a material similar to the coating used for spray-on truck bed liners for vehicles.

To install the liner according to the present method, first a supply hose is fed through the duct that is to be lined until a threaded end of the supply hose exists the duct at an opposite end of the duct system into which it was originally fed. For example, the supply hose may be fed into or enter a floor duct and exit at the entrance to the supply plenum, i.e. where the duct system attaches to the heating and air conditioning unit. Alternately, the supply hose may enter into the supply plenum and exit at one of the floor ducts.

Once the supply hose has been fed through the duct, one of several different sizes and styles of specially designed spray devices is then attached to the threaded end of the supply hose so that the supply hose is connected to and in liquid communication with a spray head provided on the spray device. Alternately, the spray head may be attached to the threaded end of the supply hose prior to inserting the supply hose into the duct. If the spray head is attached to the supply hose prior to inserting the supply hose into the duct, the spray head need not be feed through the entire duct. It may instead be inserted only to a desired stopping point within the duct, which may be the junction or "y" of the duct with the main plenum that is attached to the HVAC system. An opposite end of the supply hose is attached to a supply pump provided on the contractor's service vehicle. The supply pump is connected to a supply tank that is also provided on the contractor's service vehicle. The liner material is stored in the supply tank until needed by the supply pump which pumps the liner material through the supply hose to the spray head where the liner material is applied to the interior surface of the duct as a liner.

The spray device is provided with at least two sets of spring loaded wheels in order to support and maintain the spray head in the center of the duct as the spray device is pulled through the duct by the supply hose. Each set of wheels consists of either three or four wheels that are supported on retractable wheel arms so that the wheels are outwardly biased to force them into rolling contact with the interior surface of the duct. The retractable wheel arms allow the spray device to expand and contract in diameter in response the variation in sizes of duct found within a duct system and thereby allowing the spray device can accommodate a wide range of ducts sizes and shapes and also allowing it to negotiate corners and turns within the duct system as the spray device is pulled through the duct system.

Also, the spray head is provided with several spray nozzles that are oriented outward to insure that there is good coverage of the interior surfaces of the duct system by the liner material that emanates from the spray nozzles.

A pulling device is provided at the entrance of the supply hose into the duct and the pulling device engages the supply hose to pull the supply hose out of the air duct once the spray has been activated. Thus, as the spray head is retracted through the duct by its attached supply hose, the spray head applies a smooth, even layer of liner material on the interior surfaces of the duct from where the supply hose originally exited the duct system to where the supply hose originally entered the duct system when it was originally fed through the duct system. The pulling device may be computer controlled to insure an adequate and consistent layer of liner material is laid down on the interior surfaces of the duct system by the spray head.

Optionally, a commercially available electrostatic unit may be employed with the spray head to further facilitate good adherence of the liner material to the interior surface of the duct. The electrostatic unit is optionally provided on the contractor's service vehicle. A first lead of the unit attaches to the duct and provides the duct with an electrical charge. A second lead of the unit attaches to the supply hose and via the supply hose to the spray head, thereby providing the spray on liner material is an opposite electrical charge than that provided by the first lead to the duct. When the electrostatic unit is employed, the liner material is provided with an electrical charge that is opposite to the charge provided on the duct, thus causing the liner material to be drawn to the duct as the liner material is sprayed out of the spray head. Use of the electrostatic unit helps to insure that the liner material is applied to the interior of the duct system in a consistent thickness.

BRIEF DESCRIPTION OF THE DRAWINGS

FIG. 2 is a side view of the spray device of FIG. 1 shown inside a round air duct.

FIG. 3 is an end view of the spray device of FIGS. 1 and 2 shown inside a round air duct.

FIG. 4 is an end view of an alternate spray device shown inside a square shaped air duct.

FIG. 5 is an end view of a second alternate spray device shown inside a rectangular shaped air duct.

DETAILED DESCRIPTION OF THE PREFERRED EMBODIMENT THE INVENTION

Figure 6:
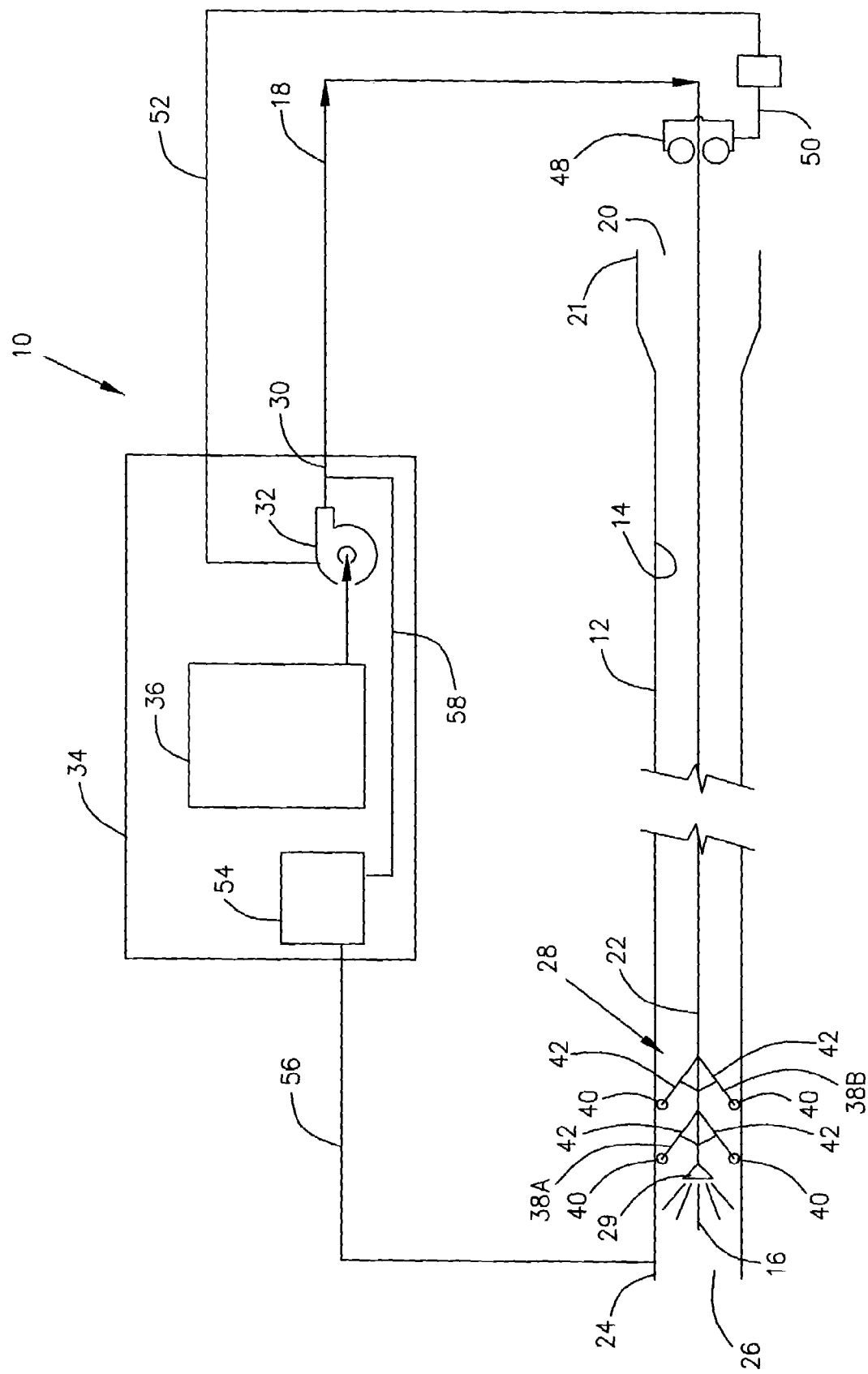
FIG. 6 is a diagram showing a system for sealing air ducts according to a preferred embodiment of the present invention.

Referring now to the drawings, and initially to FIG. 6, there is illustrated a system 10 for sealing air ducts 12 of a heating and air conditioning system as a way of remediating the air ducts 12 after the ducts 12 have been damaged due to moisture in the ducts 12 or due to movement in the cement foundation in which the air ducts 12 are located. Specifically, the system 10 is employed to coat the interior surfaces 14 of the ducts 12 of a heating and air conditioning system with a liner material 16 that is similar to the type of coating used for spray-on truck bed liners for vehicles. The preferred liner material is polyurethane that is available from Speedliner, L.L.C. in Tulsa, Okla.

To install the liner material 16 according to the present method, first a supply hose 18 is fed through a floor duct opening 20 provided at one end 21 of the duct 12 that is to be lined. The supply hose 18 is fed through the duct 12 until a threaded end 22 of the supply hose 18 exists the duct 12 at an opposite end 24 of the duct system 12 into which it was originally fed. For example, the supply hose 18 may be fed into or enter a floor duct 20 and exit at the entrance to the supply plenum 26, i.e. where the duct system 12 attaches to the heating and air conditioning unit (not illustrated). Alternately, although not illustrated, the supply hose 18 may be inserted into the duct 12 via the supply plenum 26 and exit at one of the floor ducts 20. It normally will be necessary to insert the supply hose 18 into the duct system 12 several times from different locations in the duct system 12 to obtain complete coverage of the interior surfaces 14 of the duct 12 with the liner material 16.

Once the supply hose 18 has been fed through the duct 12, one of several different sizes and styles of specially designed spray devices 28 is then attached to the threaded end 22 of the supply hose 18 so that the supply hose 18 is connected to and in liquid communication with a spray head 29 provided on the spray device 28. The size and shape of the duct 12 that is to be lined is known by the user, and therefore, the user can select the size and style of the spray device 28 that is designed to match the size and shape of the duct 12.

Alternately, the spray head 29 may be attached to the threaded end 22 of the supply hose 18 prior to inserting the supply hose 18 into the duct 12. If the spray head 29 is attached to the supply hose 18 prior to inserting the supply hose 18 into the duct 12, the spray head 29 and the attached supply hose 18 need not be feed through the entire duct 12. They may instead be inserted only to the junction or "y" in the duct 12 where the duct branches off of the main plenum which is attached to the HVAC unit.

An opposite end 30 of the supply hose 18 is attached to a supply pump 32 provided on the contractor's service vehicle 34. The supply pump 32 is connected to a supply tank 36 that is also provided on the contractor's service vehicle 34. The liquid liner material 16 is stored in the supply tank 36 until needed by the supply pump 32 which pumps the liner material 16 through the supply hose 18 to the spray head 29 where the liner material 16 is sprayed onto the interior surface 14 of the duct 12. After the liner material 16 is sprayed onto the interior surface 14 of the duct 12, it will cure rapidly to form a rigid lining within the duct 12. The liner material 16 is usually completely cured within 24 hours.

Figure 1:
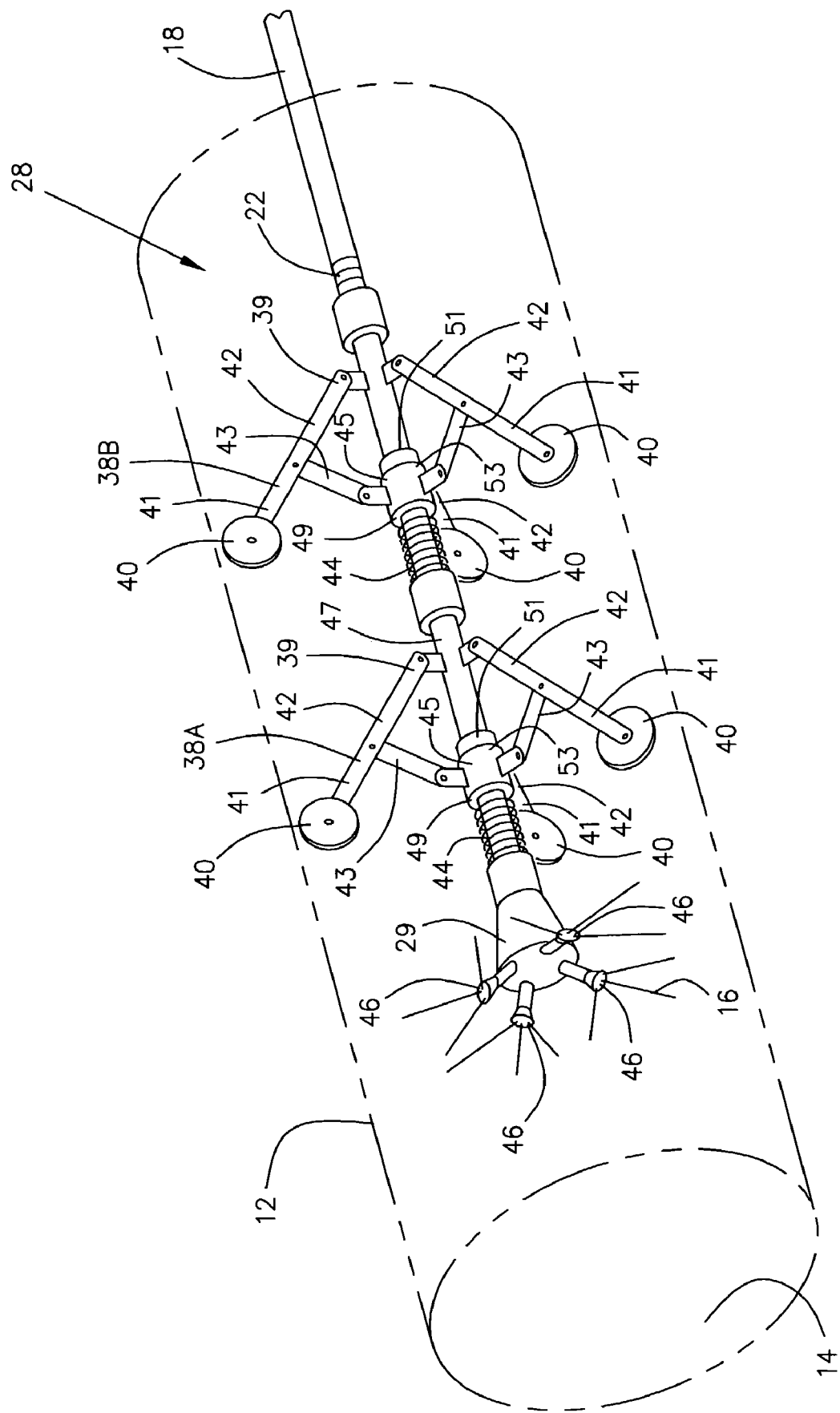
FIG. 1 is a perspective view of the spray device employed in the present invention shown inside a round air duct.

The spray device 28 is provided with at least two sets 38A and 38B of spring-loaded wheels 40 in order to support and maintain the spray head 29 in approximately the center of the duct 12 as the spray device 28 is pulled through the duct 12 by its attached supply hose 18. Each set 38A and 38B of wheels 40 consists of either three wheels 40, as illustrated in FIGS. 1–3 for the preferred embodiment of the spray device 28 for use with round air ducts 12, or alternately, of four wheels 40, as illustrated in FIGS. 4 and 5 for first and second alternate embodiment spray devices 28A and 28B for use respectively with square and rectangular ducts 12A and 12B. The wheels 40 are preferably constructed of rubber or a similar material. Also, the wheels 40 are located between the supply hose 18 and the spray head 29 so that the spray head 29 trails behind the wheels 40 as the spray device 28, 28A or 28B is pulled through the air duct 12, thus the wheels 40 do not run through the freshly applied liner material 16.

Each of the wheels 40 of spray device 28, 28A or 28B is supported on one end 41 of retractable wheel arms 42. The arms 42 are biased outward by a spring 44 so that the wheels 40 extend outward and are forced into rolling contact with the interior surface 14 of the duct 12, 12A or 12B. At a point approximately midway along the length of each retractable wheel arm 42, the arm 42 is pivotally attached mounted via a pivoting arm 43 to a ball bearing sleeve 45 that encircles a central shaft 47 of the spray device 28, 28A or 28B. The center shaft 47 is hollow and provides liquid communication between the supply hose 18 which attaches on one end of the spray device 28, 28A or 28B and the spray head 29 which is provided on an opposite end of the spray device 28, 28A or 28B.

Also, each retractable wheel arm 42 is pivotally attached to the central shaft 47 on an opposite second end 39 of the arm 42. The ball bearing sleeve 45 is sandwiched between the spring 44 that is provided encircling the central shaft 47 at one end 49 of the sleeve 45 and a stop 51 provided on an opposite end 53 of the sleeve 45. The ball bearing sleeve 45 is movable along the central shaft 47 and each of the retractable wheel arms 42 pivots inward toward the center shaft 47 or outward away from the center shaft 47 in response to movement of the ball bearing sleeve 45 along the center shaft 47. The sleeve 45 allows the wheels 40 of the spray device 28, 28A or 28B to expand until the sleeve 45 engages the stop 51 and allows the wheels 40 to contract by pushing the sleeve 45 against the spring 44. By thus moving alternately toward the stop 51 under the force of the biasing spring 44, or alternately toward the spring 44, the sleeve 45 allows the wheels 40 to expand and contract in diameter in response the variation in size and shape of the duct 12, 12A and 12B. This expanding and contracting movement of the wheels 40 allows the spray device 28, 28A, or 28B to accommodate a wide range of duct 12 sizes and shapes and allowing it to negotiate corners and turns within the duct 12 as the spray device 28, 28A, or 28B is pulled through the duct 12.

Also, the spray head 29 is provided with several spray nozzles 46 that are oriented outward toward the interior surfaces 14 of the air ducts 12, 12A or 12B to insure that there is good coverage of the interior surfaces 14 of the duct 12, 12A, or 12B by the liner material 16 that emanates from the spray nozzles 46. Optionally, the spray nozzles 46 may be designed to rotate relative to the spray device 28, 28A, or 28B as they spray to further insure that the interior surfaces 14 are adequately covered.

A pulling device 48 is provided at the entrance opening 20 of the duct 12 where the supply hose 18 is fed into the duct 12. The pulling device 48 engages the supply hose 18 in order to pull the supply hose 18 out of the air duct 12 via the opening 20 once the supply pump has been activated to begin spraying liquid liner material 16 out the spray nozzles 46. Thus, as the spray head 29 is retracted through the duct 12 by its attached supply hose 18, the spray head 29 applies a smooth, even layer of liner material 16 on the interior surfaces 14 of the duct 12. A layer of liner material 16 is applied from opening 26, i.e. the opening where the supply hose 18 originally exited the duct system 12 when the supply hose 18 was originally fed through the duct 12, to opening 20, i.e. the opening where the supply hose 18 originally entered the duct system 12 when it was originally fed through the duct system 12. As illustrated in FIG. 6 by lines 50 and 52, operation of the pulling device 48 and the supply pump 32 may be controlled by a computer 54 to insure an adequate and consistent layer of liner material 16 is laid down on the interior surfaces 14 of the duct system 12 by the spray head 29. Alternately, the pulling device 48 may be manually operated.

The supply hose 18 can be inserted into and retracted out of different sections of the duct 12 until the interior surfaces 14 of the entire duct system 12 have been coated with the liner material 16.

Optionally, a commercially available electrostatic unit 54 may be employed with the spray head 29 to further facilitate good coverage of liner material 16 onto the interior surface 14 of the duct 12. The electrostatic unit 54 is optionally provided on the contractor's service vehicle 34. A first lead 56 of the electrostatic unit 54 attaches to the duct 12 and provides the duct 12 with an electrical charge. A second lead 58 of the electrostatic unit 54 attaches to the supply hose 18 and via the supply hose 18 to the spray head 29, thereby providing the spray on liner material 16 with an opposite electrical charge than that provided by the first lead 56 to the duct 12. When the electrostatic unit 54 is employed, the liner material 16 is provided with an electrical charge that is opposite to the charge provided on the duct 12, thereby causing the liner material 16 to be drawn to the duct 12 electrostatically as the liner material 16 is sprayed out of the spray head 29. Use of the electrostatic unit 54 helps to insure that the liner material 16 is applied to the interior surfaces 14 of the duct system 12 in a consistent thickness.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for applying liquid liner material to the interior surfaces of an air duct comprising the following steps:
    a. inserting a first end of a supply line through a first opening in an air duct that is to be lined and pushing the first end of the supply line through the air duct so that the first end of the supply line stops at the entrance to the supply plenum for an air conditioning unit that provides conditioned air to the air duct,
    b. initiating flow of liquid liner material to the material to a spray device attached to the first end of the supply line via the supply line that has its opposite second end attached to a supply pump and supply tank that are designed to supply liquid liner material through the supply line to the spray device and simultaneously with initiating a pulling force on the supply line and the attached spray device so that the spray device deposits liquid liner material onto the interior surfaces of the duct continuously between the first opening in the duct and the entrance to the supply plenum as it is pulled through the duct.

2. A method for applying liquid liner material to the interior surfaces of an air duct according to claim 1 further comprising the following steps:
    c. inserting the first end of the supply line and the attached spray device through another opening provided in the air duct that is to be lined and pushing the first end of the supply line through the air duct so that the spray device and first end of the supply line travel through an unlined portion of the duct until they reach a desired stopping point in the duct where the duct branches and intersects with a portion of the duct that was previously lined, and
    d. initiating flow of liquid liner material to the spray device via the supply line simultaneous with initiating a pulling force on the supply line and the attached spray device so that the spray device deposits liquid liner material onto the interior surfaces of the unlined portion of the duct continuously as it is pulled through the duct between the desired stopping point and the opening of the duct where the spray device was inserted in step c.

3. A method for applying liquid liner material to the interior surfaces of an air duct according to claim 2 further comprising the following step:
    e. repeating steps c and d with each remaining duct opening of the duct that is to be lined until the interior surfaces of all portions of the duct are lined.

4. A method according to claim 3 further comprising the following steps that occurs between steps a and b:
    f. attaching the spray device to the first end of the supply line via a second opening that is provided in the duct at the entrance to the supply plenum for the air conditioning unit.

5. A method according to claim 3 further comprising the following steps that occur before step d:
    g. attaching one lead of an electrostatic unit to the duct and attaching a second lead of the electrostatic unit to the spray device, and
    h. activating the electrostatic unit so that the electrostatic unit provides the duct with an electrical charge that is opposite to the electrical charge that the electrostatic unit provides to the spray device.

6. A method according to claim 3 further comprising the following step that occurs after step e:

i. allowing the liquid liner material to cure on the interior surfaces of the duct.

7. A method according to claim 3 wherein a computer controls the initiation of flow of liquid liner material to the spray device and the initiation of a pulling force on the supply line so that the liner material is deposited in an even manner to the interior surfaces of the duct to form a continuous liner for the duct.

* * * * *